United States Patent
Winn et al.

[11] 3,901,926
[45] Aug. 26, 1975

[54] ALKYLPHENYL BENZOPYRANS

[75] Inventors: Martin Winn, Deerfield; Kathleen Riley Lynn, Gurnff; Yvonne Connolly Martin, Waukegan, all of Ill.

[73] Assignee: Abbott Laboratories, North Chicago, Ill.

[22] Filed: Feb. 13, 1974

[21] Appl. No.: 442,034

Related U.S. Application Data

[63] Continuation-in-part of Ser. No. 345,944, April 2, 1973, abandoned.

[52] U.S. Cl. ... 260/345.3; 260/290 HL; 260/297 R; 260/297 T; 260/343.5; 260/590; 260/625; 260/613 R; 424/263; 424/283
[51] Int. Cl.² ........................................ C07D 307/83
[58] Field of Search ................................ 260/345.3

[56] References Cited
UNITED STATES PATENTS

| | | | |
|---|---|---|---|
| 2,509,386 | 5/1950 | Adams | 260/345.3 |
| 3,639,426 | 2/1972 | Razdan et al. | 260/345.3 |
| 3,799,946 | 3/1974 | Loev | 260/345.3 |

Primary Examiner—Howard T. Mars
Assistant Examiner—Nicky Chan
Attorney, Agent, or Firm—Vincent A. Mallare; Robert L. Niblack

[57] ABSTRACT

Alkylphenyl benzopyrans represented by the formula

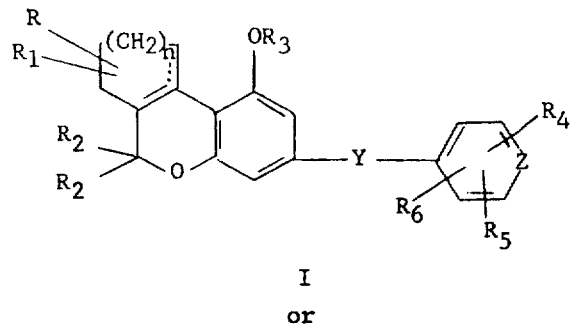

I or

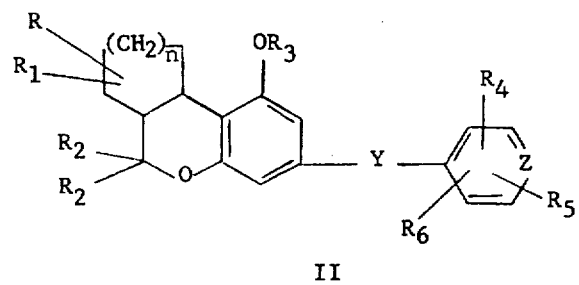

II wherein $n$ is 1 or 2; each R and $R_1$ are the same or different members of the group consisting of hydrogen or loweralkyl; $R_2$ is loweralkyl; $R_3$ is hydrogen; Y is a straight or branched chain alkylene group having from one to ten carbon atoms; and each $R_4$ and $R_5$ and $R_6$ are the same or different members of the group consisting of hydrogen, halo, trifluoromethyl or loweralkyl and Z is C or N and the pharmaceutically acceptable salts thereof.

6 Claims, No Drawings

ALKYLPHENYL BENZOPYRANS

REFERENCE TO RELATED APPLICATIONS

This application is a continuation-in-part application of U.S. Ser. No. 345,944, filed Apr. 2, 1973, now abandoned.

DETAILED DESCRIPTION OF THE INVENTION

This invention relates to novel benzopyrans and more particularly relates to benzopyrans having an alkylphenyl side chain and having more selective pharmacological actions than the corresponding natural products.

While there are a number of currently available analgesic products, the search for improved analgesic agents has continued for a number of reasons. Aspirin, one of the most effective analgesic agents, does not provide sufficient analgesia to control severe pain such as postoperative pain, pain following certain dental procedures or encountered with toothaches, pain associated with cancer, and the like. A further problem with aspirin is the side effects, particularly the gastrointestinal effects, its ulcergenicity, and the sensitivity which a number of people develop to it. A number of the more potent analgesic agents such as codiene, Demerol and morphine have a high addiction liability and are thus classified as narcotics. While one nonaddicting analgesic agent, d-propoxyphene HCl (Darvon) is available, Darvon does not produce sufficient analgesia to be useful in severe pain states. Darvon further seems to be specific for certain types of pain, and is not effective in all individuals. Therefore, the search for improved, potent, nonaddicting analgesic agents has continued. The present invention provides such agents.

It is also commonly recognized that patients suffering from severe pain, or suffering from pain for any length of time, tend to become anxious and depressed. The compounds of this invention additionally exhibit activity as anti-anxiety agents. This combination of analgesia and anti-anxiety activities makes the compounds of this invention particularly useful as a therapeutic group. In addition, the compounds are useful as antidiarrheal agents, which also makes them useful in the treatment of anxiety, which is often accompanied by diarrhea.

The compounds of this invention are represented by the formula

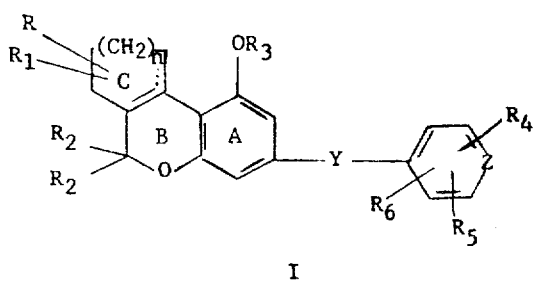

I or

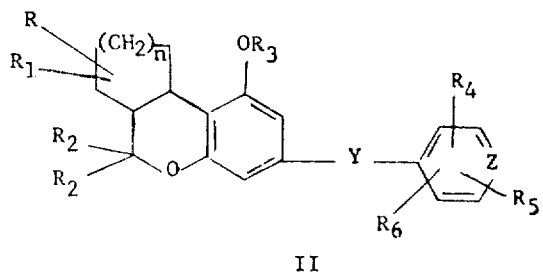

II wherein, in the C ring, a bond, followed by a dotted line indicates the double bond can appear at various positions in the ring, wherein $n$ is 1 or 2; R and $R_1$ each are the same or different members of the group consisting of hydrogen or loweralkyl; $R_2$ is loweralkyl; $R_3$ is hydrogen; Y is a straight or branched chain alkylene group having from one to ten carbon atoms; and each $R_4$ and $R_5$ and $R_6$ are the same or different members of the group consisting of hydrogen, halo, trifluoromethyl or loweralkyl and 2 is C or N; and the pharmaceutically acceptable salts thereof.

The term "loweralkyl" as used herein, refers to straight or branched chain alkyl radicals of from 1 to 6 carbon atoms such as methyl, ethyl, n-propyl, isopropyl, n-butyl, sec-butyl, n-pentyl, neo-pentyl, n-hexyl, and the like.

"Halo" includes chloro, fluoro, bromo and iodo.

The term "pharmaceutically acceptable salts" includes cationic salts such as the sodium, potassium, calcium, barium, aluminum, ammonium or substituted ammonium salts.

When, for example, $n$ is 1, the compounds are represented by formulae III, IV and V, wherein the side chain

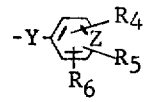

is designated as $R_9$.

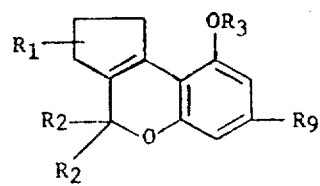

III

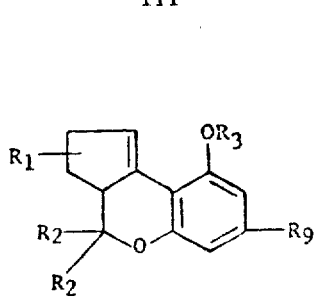

IV

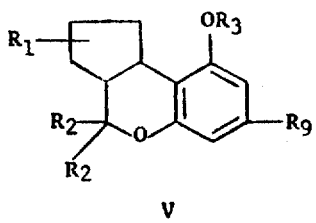

V

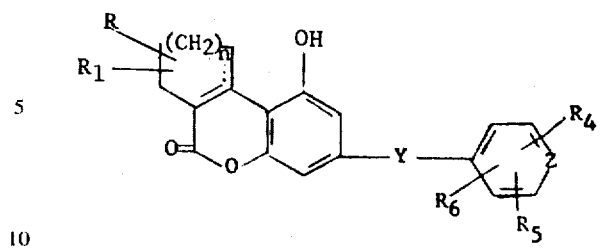

When $n$ is 2, the preferred compounds are represented by formulae VI, VII and VIII.

or

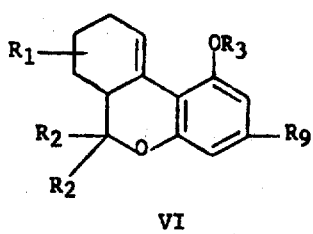

VI

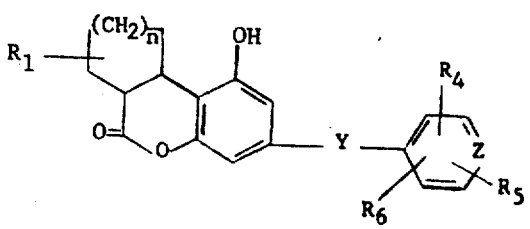

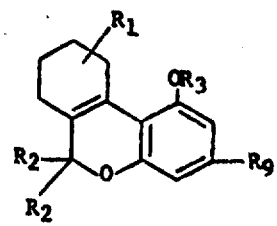

VII

VIII

Intermediates made in preparing the compounds of the invention have the following structural formulae:

wherein $n$ is 1 or 2; R and $R_1$ are hydrogen or methyl.

The compounds of this invention are useful as analgesic agents at dosages of from 0.01 to 25.0 mg./kg. of body weight daily. They may be given via oral, parenteral or intravenous administration. The presently preferred compound, 3-(4-fluorophenyl-1-methylbutyl)-1-hydroxy-6,6,9-trimethyl-7,8,9,10-tetrahydro-6H-dibenzo[b,d]pyran, has an oral $ED_{50}$ of 6.1 in the mouse writhing test for analgesia, [Whittle, Brit. J. Pharmacol., 22 296 (1964)], (codeine has an oral $ED_{50}$ of 15.6 mg./kg. in the mouse writhing test), an oral $ED_{50}$ of 5.9 mg./kg. in the rat tail flick test [Harris, et al., J. Pharm. Exp. Ther., 169 17 (1969)] and an oral $ED_{50}$ of 0.94 mg./kg. in the hot plate test.

In addition to their use as analgesic agents, the compounds are useful as mild tranquilizers at dosages of from 0.01 to 20 mg./kg. of body weight daily. Since many patients suffering from pain are anxious and apprehensive, the compounds of this invention are particularly useful as analgesic agents. The compounds further appear to produce analgesia and mild tranquilization without sedative or sedative-hypnotic effect, thus enabling the patients to carry out their normal activities while taking a compound of this invention. The compounds are also useful as antidiarrheal agents at dosages of from 0.01 to 20 mg./kg. of body weight daily.

Generally speaking, the compounds of this invention wherein $R_3$ is hydrogen can be prepared according to the following reaction scheme:

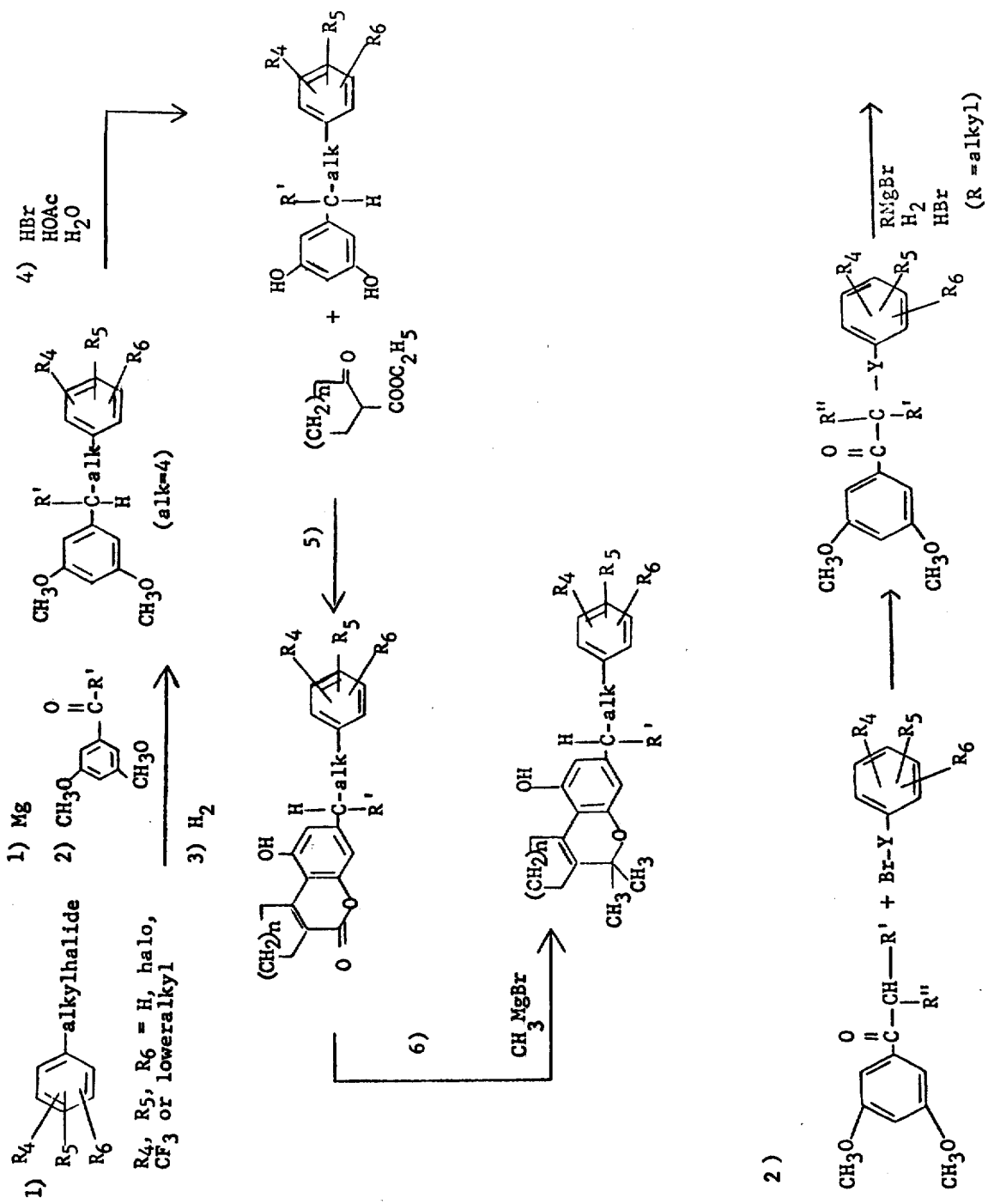

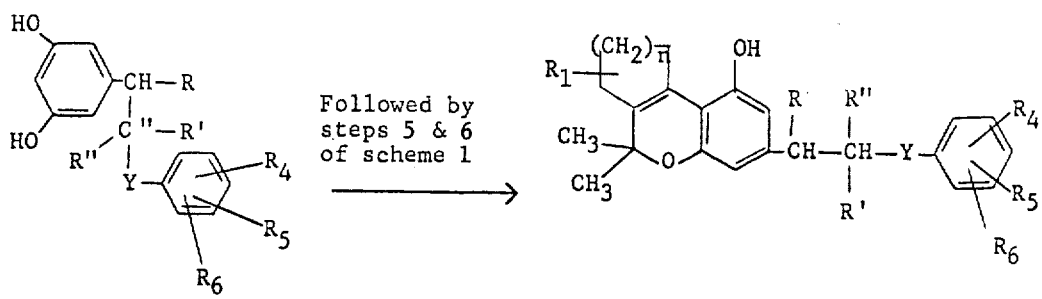

3)

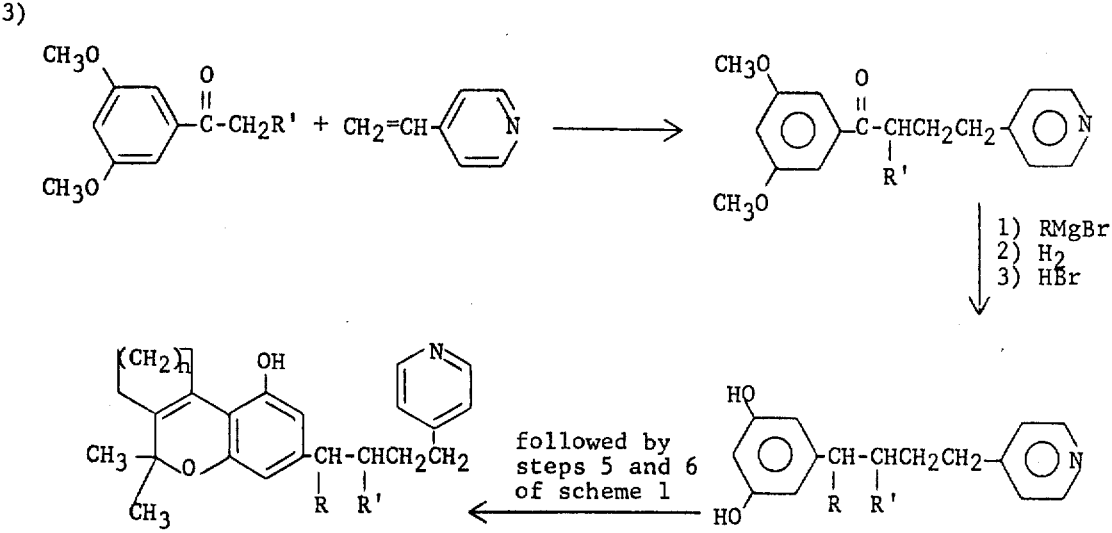

The following examples further illustrate the present invention. In these preparations a mixture is obtained with structures VII or III predominating, but also containing approximately 5 to 20 percent of VI or IV.

EXAMPLE 1

Preparation of 2-(3,5-Dimethoxyphenyl)-5-(4-Fluorophenyl)Pentane

A solution of 77 g. of 3-(4-fluorophenyl)propylbromide in 300 ml. of ether was added dropwise over a two hour period to a refluxing solution of 10 g. of magnesium in 100 ml. of ether. The reaction mixture was refluxed for an additional 30 minutes after the addition was completed. A solution of 68 g. of 3,5-dimethoxyacetophenone in 100 ml. of ether was then added dropwise to the reaction and the reaction mixture was refluxed for 1½ hours. To the reaction was added 300 ml. of a saturated ammonium chloride solution dropwise with stirring. The layers were separated and the aqueous layer extracted with ether. The ether extract was dried over magnesium sulfate and the ether removed in vacuo to give an oil. An additional 111.7 g. of 3(4-fluorophenyl)propylbromide was reacted with 3,5-dimethoxyacetophenone in the above manner. The products from both runs were hydrogenated in ethanol-HCl using palladium as the catalyst. The solvents and catalyst were removed and the crude material distilled to yield 169.0 g. of 2-(3,5-dimethoxyphenyl)-5-(4-fluorophenyl)pentane, b.p. 145–155/0.05 mmHg.

Analysis Calcd. for $C_{19}H_{23}O_2F$: C, 75.60; H, 7.69. Found: C, 75.87; H, 7.98.

EXAMPLE 2

Preparation of 2-(3,5-Dihydroxyphenyl)-5-(4-Fluorophenyl)Pentane

Fifty grams of the above-prepared 2-(3,5-dimethoxyphenyl)-5-(4-fluorophenyl)pentane, 450 ml. of acetic acid and 180 ml. of 48% HBr in water were mixed. While cooling, the mixture was saturated with hydrogen bromide gas (approximately ½ hour). The reaction was placed in an 87° bath and stirred for 17 hours. The reaction was then concentrated in vacuo and the residue neutralized with $K_2CO_3$ and $NaHCO_3$, extracted with ether, treated with charcoal and $MgSO_4$ and filtered to yield 45 g. of 2-(3,5-dihydroxyphenyl)-5-(4-fluorophenyl)pentane as a brown oil which distills at 180°/0.01 mmHg.

Analysis Calcd. for $C_{17}H_{19}O_2F$: C, 74.20; H, 6.98. Found: C, 73.56; H, 7.04.

EXAMPLE 3

Preparation of 3-(4-p-Fluorophenyl-1-Methylbutyl)-1-Hydroxy-6,6,9-Trimethyl-7,8,9,10-Tetrahydro-6H-Dibenzo[b,d]Pyran Fourteen grams of the above-prepared 2-(3,5-dihydroxyphenyl)-5-(4-fluorophenyl)pentane, 11 g. of ethyl, 4-methyl-2-cyclohexanone-1-carboxylate, 60 ml. of benzene and 3.6 ml. of $POCl_3$ were stirred and refluxed for four hours and stirred at room temperature for 12 hours. The reaction was poured into water and sodium bicarbonate, extracted with ether, dried over magnesium sulfate and concentrated to an oil. The oil was extracted with pentane to remove the unreacted keto ester. The oil was crystallized from acetonitrile to give 3(4-p-fluorophenyl-1-methylbutyl)-1-hydroxy-9-methyl-7,8,9,10-tetrahydro-6H-dibenzo[b,d]pyran-6-one, m.p. 127° – 129°C.

The above pyrone was then dissolved in 80 ml. of ether and added to a methyl magnesium bromide solution prepared from 13 g. of magnesium and 60 g. of methyl bromide in 350 ml. of ether. After refluxing 16 hours, the reaction was worked up with saturated aqueous ammonium chloride solution. The ether layer was separated, concentrated to dryness and the residue was dissolved in 300 ml. of benzene. To the benzene solution was added 0.05 g of TosOH and the reaction was refluxed for two hours, passing the condensing liquid through 4A molecular sieves. The benzene layer was extracted with sodium bicarbonate in water, concentrated to dryness and dissolved in 500 ml. of pentane. Charcoal was added to the pentane solution and the solution was filtered. The product was then chromatographed on a Florosil activated aluminum magnesium silicate 42 mm × 30 inch column and eluted with 95% pet ether and 5% ethyl ether to yield 10.4 g. of product as a colorless gum.

Analysis Calcd. for $C_{27}H_{33}FO_2$: C, 79.20; H, 8.18. Found: C, 79.36; H, 8.50.

EXAMPLE 4

Preparation of
1-Hydroxy-3-(4-Phenyl-1-Methylbutyl)-6,6,9-Trimethyl-7,8,9,10-Tetrahydro-6H-Dibenzo[b,d]Pyran 1-Hydroxy-3-(4-phenyl-1-methylbutyl)-6,6,9-trimethyl-7,8,9,10-tetrahydro-6H-dibenzo[b,d]pyran was prepared according to the method of Example 3 from 2-(3,5-dihydroxyphenyl)-5-phenylpentane.

The intermediate pyrone had m.p. 129°–131°.
Analysis Calcd. for $C_{25}H_{28}O_3$: C, 79.75; H, 7.50. Found: C, 79.58; H, 7.70.

The desired compound was a colorless gum.
Analysis Calcd. for $C_{27}H_{34}O_2$: C, 83.03; H, 8.78. Found: C, 83.23; H, 9.00.

EXAMPLE 5

Preparation of
7-(4-p-Fluorophenyl-1-Methylbutyl)-9-Hydroxy-4-Oxo-1,2,3,4-Tetrahydrocyclopenta[c][1]Benzopyrane Twenty-two grams of 5-(1-methyl-4-p-fluorophenyl butyl) resorcinol, 80 ml. of benzene, 6 ml. of $POCl_3$, 1 drop of water and 13.0 g. of 2-carbethoxycyclopentanone were refluxed for eight hours and then stirred at room temperature for eight hours. The solution was concentrated in vacuo and the residue taken up in ether and neutralized with potassium bicarbonate solution. The organic phase was dried over $MgSO_4$ and concentrated. The residue was crystallized from $CH_3CN$ to yield 15.6 g. of 7-(4-p-fluorophenyl-1-methylbutyl)-9-hydroxy-4-oxo-1,2,3,4-tetrahydrocyclopenta[c][1]benzopyran, m.p. 133°–135°C.

Analysis Calcd. for $C_{23}H_{23}O_3F$: C, 75.50; H, 6.33. Found: C, 75.15; H, 6.21.

EXAMPLE 6

Preparation of
4,4-Dimethyl-7-(4-p-Fluorophenyl-1-Methylbutyl)-9-Hydroxy-1,2,3,4-Tetrahydrocyclopenta[c][1]Benzopyran A solution of 15 g. of the above-prepared pyrone in 30 ml. of ether and 50 ml. of benzene were added slowly to a solution of $CH_3MgBr$ (0.423 mole) in 250 ml. of ether. The reaction was refluxed for 16 hours, and then 500 ml. of a saturated $NH_4Cl$ solution was added slowly. The ether layer was separated, dried over $MgSO_4$ and concentrated. The residue was dissolved in pet ether, decolorized with charcoal and chromatographed on a Florosil activated aluminum magnesium silicate 31 mm × 30 inch column to yield 10.9 g. of product as a pale yellow oil.

Analysis Calcd. for $C_{25}H_{29}O_2F$: C, 78.80; H, 7.70. Found: C, 78.80; H, 7.84.

EXAMPLE 7

1-Hydroxy-3-(4-p-Methylphenyl-1-Methylbutyl)-6,6,9-Trimethyl-7,8,9,10-Tetrahydro-6H-Dibenzo[b,d]Pyran By the method of Example 1,3-(4-methylphenyl)propyl bromide was converted into 2-(3,5-dimethoxyphenyl)-5-(4-methylphenyl)pentane, b.p. 170–175/0.6 mmHg.

Analysis Calcd. for $C_{20}H_{26}O_2$: C, 80.49; H, 8.78. Found: C, 80.31; H, 9.14.

This compound was converted to the resorcinol by the procedure of Example 2 and then to the desired product by the method of Example 3. The intermediate pyrone had m.p. 133° – 135°.

Analysis Calcd. for $C_{26}H_{30}O_3$: C, 79.96; H, 7.74. Found: C, 80.34; H, 8.00.

The final product was a colorless gum.
Analysis Calcd. for $C_{28}H_{36}O_2$: C, 83.12; H, 8.97. Found: C, 83.08; H, 9.10.

EXAMPLE 8

1-Hydroxy-3-(5-p-Fluorophenyl-1-Methylpentyl)-6,6,9-Trimethyl-7,8,9,10-Tetrahydro-6H-Dibenzo[b,d]Pyran By the method of Example 1, 4-(4-fluorophenyl)butyl chloride was converted to 2-(3,5-dimethoxyphenyl)-6-(4-fluorophenyl)hexane, b.p. 155–160/0.3mmHg.

Analysis Calcd. for $C_{20}H_{25}FO_2$: C, 75.95; H, 7.96. Found: C, 76.26; H, 7.93.

This compound was converted to the resorcinol by the procedure of Example 2 and then to the desired product by the method of Example 3. The intermediate pyrone had m.p. 146° – 147°.

Analysis Calcd. for $C_{26}H_{29}FO_3$: C, 76.44; H, 7.15. Found: C, 75.83; H, 7.14.

The final product was a colorless gum.
Analysis Calcd. for $C_{28}H_{35}FO_2$: C, 79.58; H, 8.34. Found: C, 79.65; H, 8.60.

EXAMPLE 9

1-Hydroxy-3-(5-p-Fluorophenylpentyl)-6,6,9-Trimethyl-7,8,9,10-Tetrahydro-6H-Dibenzo[b,d]Pyran By the method of Example 4, (4-fluorophenyl)butyl chloride and 3,5-dimethoxybenzaldehyde were converted to 1-(3,5-dimethoxyphenyl)-5-(4-fluorophenyl)pentane.

This compound was converted to the resorcinol by the procedure of Example 2 and then to the desired product by the method of Example 3. The intermediate pyrone had m.p. 132° – 133°.

Analysis Calcd. for $C_{25}H_{27}FO_3$: C, 76.11; H, 6.89. Found: C, 75.39; H, 6.85.

The final product was a colorless gum.

Analysis Calcd. for $C_{27}H_{33}FO_2$: C, 79.37; H, 8.14. Found: C, 78.76; H, 8.17.

EXAMPLE 10

2-(3,5-Dimethoxyphenyl)-3-Methyl-5-(p-Fluorophenyl)Pentane 3,5-Dimethoxy propiophenone (52.0 g.) was added to a suspension prepared from 13.9 g. 57% sodium hydride in mineral oil (which had been freed of mineral oil by washing with toluene) and 130 ml. toluene. The resulting mixture was refluxed 30 minutes, 51 g. of 2-(p-fluorophenyl)ethyl bromide added and refluxed 2½ hours. The mixture was worked up with water and HCl and the product distilled to give 66.4 g. 1-(3,5-dimethoxyphenyl)-2-methyl-4-(p-fluorophenyl)-1-butanone b.p. 160–175/0.3mmHg. This ketone in 300 ml. ether was treated with 130 ml. of 3 molar methyl magnesium bromide in ether and worked up with ammonium chloride to give 71.0 g. 2-(3,5-dimethoxyphenyl)-3-methyl-5-(p-fluorophenyl)-2-pentanol. This alcohol was hydrogenated in acetic acid containing 2ml. $H_2SO_4$ using palladium catalyst to give 55.0 g. of desired compound, b.p. 150–155/0.3mmHg. Gas chromatography showed two isomers of ratio 63/37.

Analysis Calcd. for $C_{20}H_{25}FO_2$: C, 75.95; H, 7.96. Found: C, 76.04; H, 8.22.

EXAMPLE 11

1-Hydroxy-3-(4-p-Fluorophenyl-1,2-Dimethylbutyl)-6,6,9-Trimethyl-7,8,9,10-Tetrahydro-6H-Dibenzo[b,d]Pyran The compound of Example 10 was converted to the resorcinol by the procedure of Example 2 and then to the desired product by the method of Example 3. The intermediate pyrone was not crystallized. The final product was a colorless gum.

Analysis Calcd. for $C_{28}H_{35}FO_2$: C, 79.58; H, 8.34. Found C, 78.81; H, 8.45.

EXAMPLE 12

2-(3,5-Dimethoxyphenyl)-3-Methyl-6-(4-Fluorophenyl)Hexane 3,5-Dimethoxy propiophenone, 3-(4-fluorophenyl)propyl bromide and methyl magnesium bromide were used to prepare the desired compound as described in Example 10. The product had b.p. 170–180/0.5mmHg. Gas chromatography showed two isomers in a 62/38 ratio.

EXAMPLE 13

1-Hydroxy-3-(5-p-Fluorophenyl-1,2-Dimethylpentyl)-6,6,9-Trimethyl-7,8,9,10-Tetrahydro-5H-Dibenzo[b,d]Pyran The compound of Example 11 was converted to the resorcinol by the procedure of Example 2 and then to the desired product by the method of Example 3. The intermediate pyrone had m.p. 116° – 117°.

Analysis Calcd. for $C_{27}H_{31}FO_3$: C, 76.75; H, 7.51. Found: C, 76.72; H, 7.51.

The final product was a colorless gum.

Analysis Calcd. for $C_{29}H_{37}FO_2$: C, 79.77; H, 8.54. Found: C, 79.49; H, 8.80.

EXAMPLE 14

1-(3,5-Dimethoxyphenyl)-2-Methyl-4-(4-Pyridyl)-1-Butanone 10 g. 3,5-dimethoxyphenylpropiophenone, 5.42 g. 4-vinylpyridine and 0.5 ml. of a 40% solution of benzyltrimethyl ammonium hydroxide in methanol were mixed and kept at 75° for two hours. The mixture was treated with aqueous hydrochloric acid and extracted with benzene (which was discarded). The aqueous phase was made basic with potassium hydroxide and extracted with chloroform. The organic phase was distilled yielding 10.36 g. of the desired product, b.p. 195–205/0.3 mmHg.

Analysis Calcd. for $C_{18}H_{21}NO_3$: C, 72.21; H, 7.07; N, 4.68. Found: C, 71.91; H, 7.10; N, 4.66.

EXAMPLE 15

2-(3,5-Dimethoxyphenyl)-3-Methyl-5-(4-Pyridyl)Pentane

The above ketone was treated with methyl magnesium bromide and the resulting alcohol hydrogenated in a manner similar to that described in Example 10. The product had b.p. 180 185/0.3mmHg.

Analysis Calcd. for $C_{19}H_{25}NO_2$: C, 76.22; H, 8.42; N, 4.68. Found: C, 75.97; H, 8.40; N, 4.68.

EXAMPLE 16

2-(3,5-Dihydroxyphenyl)-3-Methyl-5-(4-Pyridyl)Pentane

The compound of Example 15 (22.0 g.), 220 ml. acetic acid and 90 ml. 48% HBr was saturated with HBr gas and kept at 90° for 18 hours. Solvent was concentrated in vacuo and residue treated with dilute NaOH and $NaHCO_3$ to get a solid which was crystallized from dimethoxyethane and ether. Yield 19.9 g., m.p. 118° – 122°.

Analysis Calcd. for $C_{17}H_{21}NO_2$: C, 75.24; H, 7.80; N, 5.16. Found: C, 74.35; H, 7.97; N, 5.11.

EXAMPLE 17

1-Hydroxy-3[4-(4-Pyridyl)-1,2-Dimethylbutyl]-9-Methyl-6-Oxo-7,8,9,10Tetrahydro-6H-Dibenzo[b,d]Pyran The compound of Example 16 (9.10 g.) was dissolved in 20 ml. methanesulfonic acid containing 14.0 g. $POCl_3$ and 7.70 g. ethyl, 4-methyl-2-cyclohexanone-1-carboxylate and stirred four days at room temperature. Then water and $KHCO_3$ were added yielding an oil which was crystallized from acetonitrile giving 7.72 g. of desired product, m.p. 163° – 165°.

Analysis Calcd. for $C_{25}H_{29}NO_3$: C, 76.69; H, 7.47; N, 3.58. Found: C, 76.39; H, 7.56; N, 3.72.

EXAMPLE 18

1-Hydroxy-3[4-(4-Pyridyl)-1,2-Dimethylbutyl]-6,6,9-Trimethyl-7,8,9,10-Tetrahydro-6H-Dibenzo[b,d]Pyran 12.2 g. of the pyrone of Example 17 was added portionwise to a solution of 105 ml. of 3 molar methyl magnesium bromide in tetrahydrofuran and refluxed two hours. The solution was cooled and worked up with saturated ammonium chloride solution. The tetrahydrofuran was removed in vacuo and replaced with chloroform. Hydrogen bromide gas was bubbled in and the sulution boiled 15 minutes. The solution was neutralized with $KHCO_3$ and chromatographed on Florosil eluting with 50% ether, 50% cyclohexane, giving 5.09 g. yellow gum.

Analysis Calcd. for $C_{27}H_{35}NO_2$: C, 79.31; H, 9.17; N, 3.19. Found: C, 79.96; H, 8.70; N, 3.45.

(NMR shows traces of ethyl ether.)

EXAMPLE 19

1-Hydroxy-3-(3-p-Fluorophenyl-1-Methylbutyl)-6,6,9-Trimethyl-7,8,9,10-Tetrahydro-6H-Dibenzo[b,d]Pyran By the method of Example 1, 2-(4-fluorophenyl)ethyl bromide was converted into 2-(3,5-dimethoxyphenyl)-4-(4-fluorophenyl) butane, b.p. 145–155/0.3mmHg.

Analysis Calcd. for $C_{18}H_{21}FO_2$: C, 75.01; H, 7.34. Found: C, 75.09; H, 7.54.

The compound was converted to resorcinol by the procedure of Example 2 and then to the desired product by the method of Example 3. The intermediate pyrone had m.p. 148°–150°.

Analysis Calcd. for $C_{24}H_{25}FO_3$: C, 75.85; H, 6.63. Found: C, 76.69; H, 6.81.

The final product was a colorless oil.

Analysis Calcd. for $C_{26}H_{31}FO_2$: C, 79.10; H, 7.93. Found: C, 79.14; H 7.85.

EXAMPLE 20

1-Hydroxy-3-(4-p-Fluorophenyl-1-methylbutyl)-6,6,9-Trimethyl-6a,7,8,9,10,10a Hexahydro-6H-Dibenzo[b,d]Pyran 1-Hydroxy-3-(4-p-fluorophenyl-1-methylbutyl)-6,6,9-trimethyl-7,8,9,10-tetrahydro-6H-dibenzo[b,d]pyran was dissolved in ethanol and hydrogenated with 5% palladium on charcoal as catalyst. After one equivalent of hydrogen was absorbed, the catalyst was removed and the solution concentrated to give the desired product.

EXAMPLE 21

4,4-Dimethyl-7-(4-p-Fluorophenyl-1-Methylbutyl)-9-Hydroxy-1,2,3,3a,4,9b-Hexahydrocyclopenta[c][1]Benzopyran 4,4-Dimethyl-7-(4-p-fluorophenyl-1-methylbutyl)-9-hydroxy-1,2,3,4-tetrahydrocyclopenta[c][1]benzopyran was hydrogenated as described in Example 20 to give the desired product as a colorless oil.

EXAMPLE 22

4,4-Dimethyl-7[5-(4-Chloro-3-Trifluoromethylphenyl)-1,2-Dimethylpentyl]-9-Hydroxy-1,2,3,4-Tetrahydrocyclopenta[c][1]Benzopyran 4-Chloro-3-trifluoromethylaniline was converted to the diazonium salt with sodium nitrite and sulfuric acid and this was reacted with acrylic acid (the Meerwein reaction) to give 4-chloro-3-trifluoromethylcinnamic acid. This acid was hydrogenated, reduced with lithium aluminum hydride to the alcohol and reacted with phosphorus tribromide to give 3-(4-chloro-3-trifluoromethyl)propyl bromide. This bromide was converted into 2-(3,5-dimethoxyphenyl)-3-methyl-6-(4-chloro-3-trifluoromethyl)hexane by the method described in Example 10. This compound was converted to the resorcinol by the procedure of Example 2 and this reacted with 2-carbethoxycyclopentanone as in Example 5 and with methyl magnesium bromide as in Example 6 to give the desired product.

EXAMPLE 23

1,4,4-Trimethyl-7[4-(2,6-Dichloro-4-Methylphenyl)-1-Methylbutyl]-9-Hydroxy-1,2,3,4-Tetrahydrocyclopenta[c][1]Benzopyran 2,6-Dichloro-4-methylaniline was converted to 3-(2,6-dichloro-4-methylphenyl)propylbromide by using the method described in the first half of Example 22. This was converted to 2-(3,5-dimethoxyphenyl)-5-(2,6-dichloro-4-methylphenyl) pentane by the method of Example 1. This compound was converted to the resorcinol by the procedure of Example 2 and this was reacted with 2-carbethoxy-5-methylcyclopentanone by the method of Example 5 and with methyl magnesium bromide as in Example 6 to give the desired product.

EXAMPLE 24

1-Hydroxy-3-(4-p-Isopropylphenyl-1-Methylbutyl-6,6,10-Trimethyl-7,8,9,10-Tetrahydro-6H-Dibenzo[b,d]Pyran 4-Isopropyl benzaldehyde and malonic acid were converted to 4-isopropylcinnamic acid and then to 3-(4-isopropylphenyl)propyl bromide using in this order the following reagents: 1) hydrogen, 2) lithium aluminum hydride, 3) phosphorus tribomide. This was converted to 5-(4-p-isopropylphenyl)-2-(3,5-dimethoxyphenyl)pentane by the method of Example 1. This compound was converted to the resorcinol by the procedure of Example 2 and this was reacted with 2-carbethoxy-6-methylcyclohexanone and then with methylmagnesium bromide by the method of Example 2 to give the desired product.

EXAMPLE 25

1-Hydroxy-3[6-(2,4,6-Trifluorophenyl)-1,2-Dimethylheptyl]-6,6,9,9-Tetramethyl-7,8,9,10-Tetrahydro-6H-Dibenzo[b,d]Pyran 2,4,6-Trifluoroaniline is converted to 2,4,6-trifluorocinnamic acid via the diazonium salt and acrylic acid. This was converted into 3-(2,4,6-trifluorophenyl)propyl bromide by using the method described in the first half of Example 22. This bromide was reacted with 1) magnesium, 2) ethylene oxide and 3) phosphorus tribromide to give 5-(2,4,6-trifluorophenyl)pentylbromide. This bromide was converted to 2-(3,5-dimethoxyphenyl)-3-methyl-8-(2,4,6-trifluorophenyl) octane by the method described in Example 10. This compound was converted to the resorcinol by the procedure of Example 2 and then reacted with 2-carbethoxy-5,5-dimethylcyclohexanone and then with methylmagnesium bromide by the method of Example 2 to give the desired product.

The present invention includes within its scope pharmaceutical compositions comprising, as an active ingredient, at least one of the compounds of this invention in association with a pharmaceutically acceptable carrier or diluent. The compounds of this invention exhibit both oral and parenteral activity and can be formulated in dosage forms for oral, parenteral or rectal administration.

Solid dosage forms for oral administration include capsules, tablets, pills, powders and granules. In such solid dosage forms, the active compound is admixed with at least one inert diluent such as sucrose, lactose or starch. Such dosage forms can also comprise, as is normal practice, additional substances other than inert diluents; e.g., lubricating agents such as magnesium stearate, and sweetening and flavoring agents. Tablets and pills can additionally be prepared with enteric coatings. Liquid dosage forms for oral administration include pharmaceutically acceptable emulsions, solutions, suspensions, syrups and elixirs containing inert diluents commonly used in the art, such as water. Besides inert diluents, such compositions can also include adjuvants, such as wetting agents, emulsifying and suspending agents and sweetening, flavoring and perfuming agents. Preparations according to this invention for parenteral administration include sterile aqueous or nonaqueous solutions, suspensions or emulsions. Examples of nonaqueous solvents or vehicles are propylene glycol, polyethylene glycol, vegetable oils, such as olive oil, and injectable organic esters such as ethyl oleate. Such dosage forms may also contain adjuvants such as preserving, wetting, emulsifying and dispersing agents. They may be sterilized by, for example, filtration through a bacteria-retaining filter, by incorporating sterilizing agents into the compositions, by irradiating the composition, or by heating the compositions. They can also be manufactured in the form of sterile solid compositions which can be dissolved in sterile water or some other sterile injectable medium immediately before use.

Compositions for rectal administration are suppositories which may contain in addition to the active substance, excipients such as cocoa butter or a suppository wax.

The dosage of active ingredient in the compositions of this invention may be varied; however, it is necessary that the amount of the active ingredient shall be such that a suitable dosage form is obtained. The selected dosage depends upon the desired therapeutic effect, on the route of administration and on the duration of the treatment.

The following example further illustrates the pharmaceutical compositions which are a feature of this invention:

EXAMPLE 26

Tablets weighing 200 mg. and having the following composition are prepared by standard tableting procedures:

| Ingredient | Mg. |
|---|---|
| 4-p-fluorophenyl-1-methylbutyl)-1-hydroxy-6,6,9-trimethyl-7,8,9,10-ahydro-6H-dihenzo[b,d]pyran | 100 |
| Starch | 94 |
| Colloidal silica | 5 |
| Magnesium stearate | 1 |

It will be understood by those skilled in the art that the above composition can contain any of the compounds of this invention.

We claim:

1. A compound of the formula

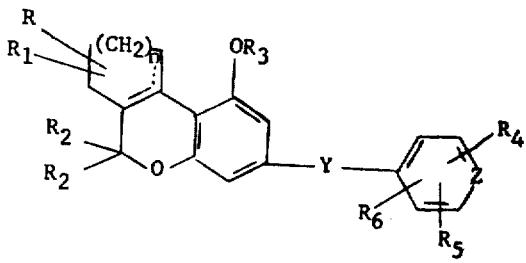

wherein $n$ is 2; R and $R_1$ each are the same or different members of the group consisting of hydrogen and loweralkyl; $R_2$ is loweralkyl; $R_3$ is hydrogen; Y is a straight or branched chain alkylene group having from one to ten carbon atoms; and each $R_4$ and $R_5$ and $R_6$ are the same or different members of the group consisting of loweralkenyl, hydrogen, halo, trifluoromethyl, loweralkyl, and Z is C and the pharmaceutically acceptable salts thereof.

2. A compound in accordance with claim 1 of the formula

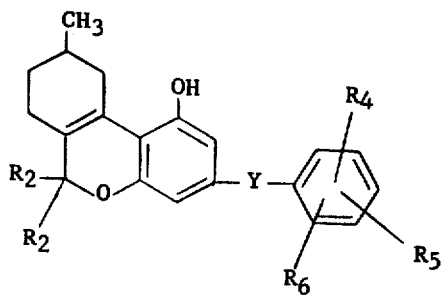

3. A compound in accordance with claim 1 of the formula

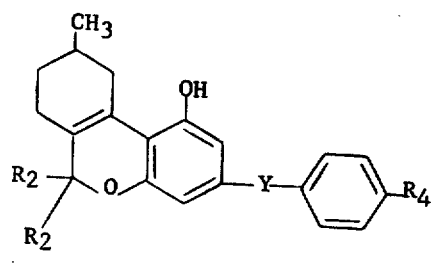

4. A compound in accordance with claim 3: 1-hydroxy-3-(4-p-fluorophenyl-1-methylbutyl)-6,6,9-trimethyl-7,8,9,10-tetrahydro-6H-dibenzo[b,d]pyran.

5. A compound in accordance with claim 3: 1-hydroxy-3-(4-phenyl-1-methylbutyl)-6,6,9-trimethyl-7,8,9,10-tetrahydro-6H-dibenzo[b,d]pyran.

6. A compound in accordance with claim 3: 3-(4-p-fluorophenyl-1,2-dimethylbutyl)-1-hydroxy-6,6,9-trimethyl-7,8,9,10-tetrahydro-6H-dibenzo[b,d]pyran.

* * * * *